(12) United States Patent
Richard

(10) Patent No.: US 8,059,023 B2
(45) Date of Patent: Nov. 15, 2011

(54) RADAR DEVICE FOR MARITIME SURVEILLANCE

(75) Inventor: Jacques Richard, Toulouse (FR)

(73) Assignee: Thales, Neuilly sur Seine (FR)

( * ) Notice: Subject to any disclaimer, the term of this patent is extended or adjusted under 35 U.S.C. 154(b) by 31 days.

(21) Appl. No.: 12/619,826

(22) Filed: Nov. 17, 2009

(65) Prior Publication Data
US 2010/0141507 A1   Jun. 10, 2010

(30) Foreign Application Priority Data

Nov. 21, 2008   (FR) .................................... 08 06549

(51) Int. Cl.
*G01S 13/00*   (2006.01)
(52) U.S. Cl. ............... 342/25 B; 342/25 R; 342/25 A; 342/25 C; 342/25 D; 342/25 E; 342/25 F
(58) Field of Classification Search ............... 342/25 R, 342/25 A, 25 B, 25 C, 25 D, 25 E, 25 F
See application file for complete search history.

(56) References Cited

U.S. PATENT DOCUMENTS

| 4,851,848 | A | * | 7/1989 | Wehner | 342/25 D |
| 5,051,749 | A | * | 9/1991 | Stoyle | 342/25 A |
| 5,745,069 | A | * | 4/1998 | Gail | 342/25 F |
| 5,886,662 | A | * | 3/1999 | Johnson | 342/25 A |
| 6,388,606 | B1 | * | 5/2002 | Keydel et al. | 342/25 R |
| 6,870,500 | B2 | * | 3/2005 | Suess et al. | 342/25 F |
| 7,705,766 | B2 | * | 4/2010 | Lancashire et al. | 342/25 F |
| 2009/0051587 | A1 | * | 2/2009 | Lancashire et al. | 342/25 F |

FOREIGN PATENT DOCUMENTS

WO   WO 2007/057707   5/2007

* cited by examiner

*Primary Examiner* — Thomas Tarcza
*Assistant Examiner* — Peter Bythrow
(74) *Attorney, Agent, or Firm* — LaRiviere, Grubman & Payne, LLP

(57) ABSTRACT

The present invention relates to a radar device for maritime surveillance, intended to be installed on a vehicle moving at very high altitude, generally on a satellite.

The invention consists more precisely in a partial synthetic aperture radar with a low repetition frequency, making it possible to provide quality maritime surveillance and guaranteeing good performance in terms of target detection probability and ability to process vast maritime expanses.

8 Claims, 1 Drawing Sheet

RADAR DEVICE FOR MARITIME SURVEILLANCE

PRIORITY CLAIM

This application claims priority to French Patent Application Number NX 08 06549, entitled Dispositif De Radar Pour La Surveillance Maritime, filed Nov. 21, 2008.

TECHNICAL FIELD

The present invention relates to a radar device for maritime surveillance, intended to be installed on a vehicle moving at very high altitude, that is to say generally on a satellite. Maritime surveillance radar means a radar whose task is to establish a map of the situation of objects or "targets" sailing on the surface of areas of water on the Earth.

More precisely, the invention aims to improve SAR (Synthetic Aperture Radar) devices for the purpose of favouring the detection of "targets" sailing on the surface of seas and oceans.

In order to succeed in the task of detecting "targets", a radar must have a substantially decametric spatial resolution. Moreover, the maritime surveillance task necessitates wide radar cover, given the immensity of the surfaces to be observed. Current radar concepts do not reconcile these two aspects.

For the purpose of clarity, certain technical terms in the field of the invention will now be defined. Hereafter, notably in the description and in the claims:
  detection probability means the statistical probability that a radar will detect the presence of a target actually present in a noisy environment;
  false alarm probability means the statistical probability that a radar will detect the presence of a target which is not actually present in a noisy environment;
  spatial resolution of a radar means the smallest separation in distance, usually expressed in meters, between two identical targets for which said radar is able to determine the presence of two targets and not of a single target;
    azimuth resolution in this context means the spatial resolution in the azimuth direction;
    as for the distance resolution, this means the spatial resolution in the distance direction, perpendicular to the azimuth direction;
  the cover of a radar means the zone observed by the radar;
  the swath width of a radar installed on a very high altitude vehicle, such as a satellite, means the width of the zone observed by the radar, in the direction perpendicular to the direction of movement of the vehicle carrying the radar;
  repetition frequency means the frequency of transmission of pulses by a pulse radar;
  echo means the signal returned to the radar by the objects illuminated by a pulse transmitted by said radar;
  clutter usually means an unwanted echo; sea clutter is consequently the echo returned by a maritime zone having no targets;
  resolution cell means the elementary area, of the ground or of the sea, retrieved by the radar after processing the echo.

It will be noted that reduction of the size of the spatial resolution cell makes it easier to detect small targets, because the power of the clutter, proportional to the area of that cell, is thereby also reduced. In fact, a target is detected as soon as it returns an echo having higher power than that of a clutter, but considerations of the energy requirements of the radar instrument coupled with the need to reduce the thermal noise level picked up by the receiver of the instrument limit this resolution to a few tens of meters.

Moreover, the invention relates to the field of pulse radars, that is to say radars which transmit pulses at a certain frequency, called the repetition frequency, via a transmit antenna, for example towards the ground, and measure the echo returned by the ground to a receive antenna of said radar. The transmit antenna and the receive antenna are often one and the same physical antenna, in which case the term "monostatic instrument" is used. During operation, the transmitted pulses, having a certain energy, illuminate an area divided up into resolution cells; the radar measures and processes the signal reflected by each of these cells of this area.

Moreover, in order to improve the performance of maritime surveillance radars, the necessity of reducing the number of ambiguous echoes and their amplitude is known. The echo of a given target is characterized by its time of reception and by its Doppler frequency resulting from the movement of the satellite. An ambiguous echo (or ambiguity) is a parasitic echo corresponding to the response from a zone separate from that of the "useful" resolution cell, directly illuminated by the radar pulse considered to be at the origin of the echo, and being superimposed exactly with regard to time of reception and Doppler frequency on the "useful" signal. These ambiguities are due to the pulse mode functioning of the radar. There are two types of ambiguities: so-called "distance" ambiguities correspond to echoes from zones situated in the direction normal to the direction of movement—the place of zero Doppler points—and responding to earlier or later pulses. So-called "azimuth" ambiguities correspond to echoes from zones situated at the same distance as the "useful" area and whose Doppler frequency is ambiguous with the Doppler frequency of the useful zone—the regular transmission of pulses by the radar makes the Doppler spectrum of the echoes periodic.

For global maritime surveillance from space, the performance objectives of the radar instrument are of the order of 90% for the detection probability and $10^{-7}$ for the false alarm probability. These performance figures typically necessitate spatial resolutions of the order of several tens of meters in distance by several tens of meters in azimuth.

Currently, in order to carry out maritime surveillance missions, SLAR (Side-Looking Aperture Radar) real aperture radars, generally installed on satellites, are typically used. By way of example, it is possible to mention the Russian RORSAT satellites which were operational from 1965 to 1988. These side-looking radars are considered as particularly well suited for the observation of vast expanses. They comprise one or more antennas oriented to the left or to the right of the path followed by their carrying satellites, perpendicular to their direction of movement. These antennas transmit and/or receive with beams whose aperture in elevation is related to the swath width of the radar. In order for the cover of the radar to be as big as possible, a very wide swath width, typically of 1000 kilometers, is chosen. In order that the distance ambiguities are attenuated by the antenna diagram of the radar, the latter is characterized by a low repetition frequency, of the order of 100 Hertz, for a swath of 1000 kilometers. Its spatial resolution is certainly a few tens of meters in distance but is several kilometers in azimuth, because the azimuth resolution is determined by the footprint of the antenna beam on the ground in azimuth, that is to say typically 5.5 kilometers for a satellite moving at 600 kilometers, a radar working in X-band at 9.6 gigahertz, and using an antenna of length 10 meters aimed towards a zone at an incidence of 70°. It will be recalled that the incidence is the angle formed by the local vertical at the radar and the direction of arrival of the transmitted radar signal.

Such a spatial resolution does not make it possible to obtain satisfactory detection performance for targets of decametric size.

However, in the prior art synthetic aperture radars are found whose particularity is to apply a digital azimuth aperture processing making it possible to simulate an antenna of very long length by recording and integrating, in a coherent manner, the echoes received for several successive positions of the antenna of the radar. The azimuth resolution being inversely proportional to the length of the synthesized antenna, it is possible with this type of radar to obtain a metric spatial resolution, theoretically able to reach half the length of the antenna in azimuth resolution in the direction of movement, that is to say 5 meters for a ten-meter antenna.

However, the current synthetic aperture radars on a satellite in a low orbit have a relatively high repetition frequency, conventionally of the order of 1500 Hertz with a ten-meter antenna in order to meet the good image quality requirement. In fact, in order to remove the azimuth ambiguities in the secondary lobes of the azimuth antenna diagram, and in order to allow the integration of the synthetic aperture digital processing, usually called SAR processing, the radar pulses must be close.

Consequently, such synthetic aperture radars generally have a swath width of the order of 100 kilometers in order to also obtain distance ambiguities rejection, very much less than the desired 1000 kilometers in order to carry out maritime surveillance missions efficiently.

In brief, radars of the prior art do not make it possible to benefit simultaneously from a decametric spatial resolution and from a large swath width, of the order of 1000 km. The radar device according to the invention overcomes this difficulty and makes it possible to provide quality maritime surveillance, guaranteeing good performance in terms of target detection probability and of ability to process vast maritime expanses.

SUMMARY OF THE INVENTION

For this purpose, the invention relates to a partial synthetic aperture radar device intended for maritime surveillance and intended for being installed on a vehicle moving at very high altitude and having a substantially decametric spatial resolution, characteristic of synthetic aperture radars, and a swath width, characterized in that it has a low repetition frequency, such that said swath width and said repetition frequency satisfy the expression, where c is the speed of propagation of radio waves, F is the swath width, Fr is the repetition frequency and inc is the incidence of the signal transmitted by said radar device, such that the swath width is large, typically of the order of 1000 km, and in that it comprises means for integrating a plurality of images of a same zone in a coherent manner and in a non-coherent manner, in such a way as to improve the probability of detection of small targets in said zone.

Advantageously, the repetition frequency is of the order of one hundred Hertz.

Advantageously, the spatial resolution is substantially equal to a few tens of meters in distance by a few tens of meters in azimuth.

In an example embodiment of the invention, the spatial resolution is substantially equal to 25 meters in distance by 25 meters in azimuth. In this context, the swath width can moreover be substantially equal to 1000 kilometers, the incidence substantially equal to 70° and the repetition frequency substantially equal to 100 Hertz.

Advantageously, the radar device according to the invention comprising a receive antenna, said receive antenna can comprise a receive beam aperture which is very narrow in elevation in comparison with the transmit beam aperture, typically by a ratio greater than or equal to about five, and means of dynamic orientation of said receive beam aperture towards the direction of arrival of the echo, in such a way as to increase the reception gain of said synthetic aperture radar device according to the invention.

Advantageously, said means of dynamic orientation of the receive beam aperture comprise electronic scanning means on reception, making it possible to follow the direction of arrival of the echo.

In general, the vehicle moving at very high altitude is a satellite.

BRIEF DESCRIPTION OF THE DRAWING

Other features and advantages of the invention will become apparent with the help of the following description given with reference to the appended FIG. 1 which shows a diagram illustrating the operating principle of a real aperture or synthetic aperture side-looking radar.

DETAILED DESCRIPTION OF THE INVENTION

Figure 1:
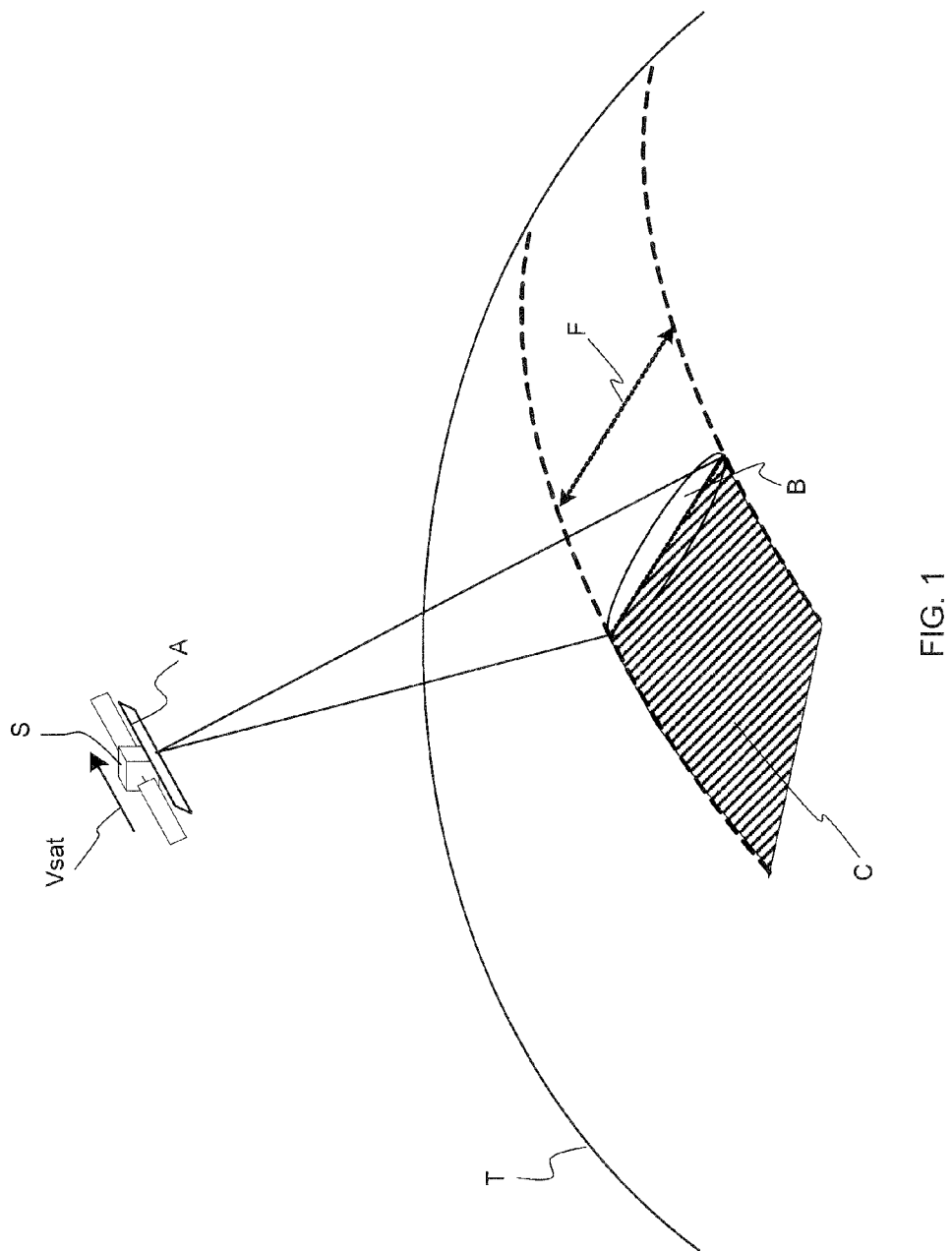

FIG. 1 shows a maritime surveillance pulse radar satellite S, moving in the direction Vsat. This diagram makes it possible to explain, in a simplified manner, the operation of such a radar satellite S, which can be a real aperture or a synthetic aperture side-looking radar, said operating principle being substantially the same in the device according to the invention as in the devices of the prior art. However, in the context of the implementation of the invention, it could only be a synthetic aperture radar having particular features.

Most satellites for observing the earth T, like the satellite S, are side-looking radar satellites, that is to say they comprise an antenna A aimed sideways from the satellite S, with a beam which, with respect to the direction of movement Vsat of the satellite S, is wide in the direction perpendicular to the direction Vsat and narrow in the direction Vsat. At a given time, the radar installed on the satellite S transmits a pulse whose footprint on the ground is represented in the FIGURE by the footprint of the antenna beam B. This footprint of the antenna beam B has a width which corresponds to the swath width F. Said pulse is reflected by the earth, the sea and the possible targets on their surface, and the analysis of the reflected power received by the satellite will make it possible to image the zone corresponding to the footprint of the antenna beam B. At the next pulse, the radar satellite S has carried out an elementary movement and a new zone illuminated by the antenna A of the radar satellite S is imaged. It is therefore possible to progressively image a zone corresponding to the cover C of the radar installed on the satellite S.

As seen previously, the frequency of the pulses is called the repetition frequency. In the prior art, the satellite S, when it is a synthetic aperture satellite, systematically has a high repetition frequency, higher than the Doppler band having to be processed, for the reasons mentioned above. Synthetically, it can be said that the removing of the ambiguities in the azimuth direction requires the increasing of the repetition frequency of the radar whereas the removing of the ambiguities in the distance direction requires the reduction of this repetition frequency. These two conditions are therefore contradictory and necessitate a compromise in the choice of repetition frequency. Conventionally, the sizing of a synthetic aperture radar depends on the size of the antenna that can be installed, typically having a length of 10 meters, and on the choice of the radar frequency. The azimuth dimension of the footprint of the antenna beam B is derived therefrom, and then the minimum repetition frequency making it possible to remove the azimuth ambiguities; this repetition frequency thus calculated is of the order of 1500 Hertz for a 10 meter antenna transmitting in X-band and a satellite moving in a low orbit. The value of this repetition frequency gives the spacing between the distance ambiguities, which makes it possible to calculate the maximum swath width F and then to derive from it the height of the antenna. For the typical values already quoted, a maximum swath width F of 100 kilometers is obtained, which is very much less than the desired width of about 1000 kilometers. As will be seen below, the invention challenges this situation by proposing a special synthetic aperture satellite having a low repetition frequency, for example of the order of 100 Hertz.

In fact, the basic idea of the invention aims to determine the best possible compromise between wide radar cover, made necessary by the fact that the maritime surveillance task ipso facto involves the observation of vast expanses, and decametric spatial resolution, essential in order to obtain satisfactory target detection probability performance.

Detection performance for a target, say a ship on the surface of an ocean, is defined by the contrast between the power reflected by the said target and the sum of that reflected by the sea clutter and the thermal noise. This ratio $$\left( \frac{P_{Cible}}{P_{Clutter} + B_{Thermique}} \right),$$

where $P_{Cible}$ is the power density reflected by the target to be detected, $P_{Clutter}$ is the power density reflected by the sea clutter and $B_{Thermique}$ is the thermal noise, must be greater than a detectability threshold $S_d$ which depends on the detection probability of the radar, the false alarm probability and on the number of echoes integrated after detection; this is post-integration. It will be noted that efficiency of the post-integration necessitates that the echoes are mutually independent, which is obtained by implementing frequency agility at the level of the instrument, from pulse to pulse.

The power density reflected by the target to be detected is proportional to the radar cross-section of said target. The radar cross-section of an object is expressed in square meters and represents the relative size of the surface of the object in question reflecting the radar beam illuminating said object. This radar cross-section is an intrinsic characteristic of any target. The power density reflected by the sea clutter is proportional to the product of the azimuth resolution and the distance resolution. Finally, the thermal noise is inversely proportional to the product of the gain of the antenna A when transmitting and the gain of the antenna A when receiving.

The introduction of azimuth synthetic aperture makes it possible, as has been seen, to improve the azimuth resolution, the latter being able to reach half of the length of the antenna A. On the other hand, the choice of a low repetition frequency with respect to the Doppler band that is desired to be processed, of the order of 100 Hertz for example, and therefore very much lower than the Doppler band of 1500 Hertz in our example, gives rise to an increase in the number of azimuth ambiguities and degrades the power density of the sea clutter. However, the overall outcome of these two aspects is a significant gain in the contrast, since it can reach 17 decibels with the numerical values mentioned previously and an azimuth resolution equal to the limit value corresponding to half of the length of the antenna A. The gain in detection performance is not however in this same ratio because the introduction of coherent processing results in a loss in the number of post-integrated pulses; no post-integration is possible if all of the pulses received are integrated coherently. It is thus advantageous to combine the two type of processing: coherent and non-coherent. An optimum appears between the number of pulses integrated coherently and the number of post-integrated pulses (non-coherent integration).

For a coherent integration corresponding to an azimuth resolution of 25 meters, close to the optimum of the method, the overall detection performance gain is of the order of 6.6 decibels.

This improvement in the detectability of targets sailing on the surface of the seas notably makes the detection of ships in rough sea conditions easier.

Optionally, the invention can be completed by the integration with the installed radar according the invention of a known technology consisting in the use, for the antenna A during reception, of a very narrow beam, and means of dynamic orientation of said beam towards the direction of arrival of the echo. This makes it possible to increase the receive gain and therefore to reduce the thermal noise and to improve the detectability. In fact, the distinction between the gain of the antenna A during transmission and the gain of the antenna A during reception makes it possible to be free, during reception, from the constraint of illumination of the zone to be observed, and therefore of the aperture of the beam in elevation. It is therefore possible to generate a very narrow receive beam, insofar as it is combined with dynamic means of orientation towards the direction of arrival of the echo. The axis of the receive beam must in fact follow the direction of arrival of the echoes in a deterministic manner. In order to allow their implementation, these means of dynamic orientation of the receive beam can comprise electronic scanning means.

This technology ideally completes the device according to the invention, improving its performance in terms of detection probability.

In brief, the invention consists in a radar installed on a very high altitude vehicle, such as a satellite, intended for maritime surveillance. Its main advantage is that it simultaneously has a large swath width, typically of the order of 1000 kilometers, and a decametric spatial resolution, typically of the order of 25 meters by 25 meters. Whilst being perfectly suitable for maritime surveillance because of its large radar cover, the device according to the invention also exhibits good efficiency from the target detection probability point of view.

The invention claimed is:

1. Partial synthetic aperture radar device intended for maritime surveillance and intended for being installed on a vehicle (S) moving at very high altitude and having a substantially decametric spatial resolution, characteristic of synthetic aperture radars, and a swath width, having a low repetition frequency, such that said swath width and said repetition frequency satisfy the expression c≈2*F*Fr*sin(inc), where c is the speed of propagation of radio waves, F is the swath width, Fr is the repetition frequency and inc is the incidence of the signal transmitted by said radar device, such that the swath width is large, and comprising means for integrating a plurality of images of a same zone in a coherent manner and means for integrating after detection the plurality of images_in a non-coherent manner, in such a way as to improve the probability of detection of small targets in said zone.

2. Device according to claim 1, wherein the repetition frequency is between a few tens of and a few hundred Hertz.

3. Device according to claim 1, wherein the spatial resolution is substantially equal to a few tens of meters in distance by a few tens of meters in azimuth.

4. Device according to claim 1, wherein the swath width (F) is substantially equal to 1000 kilometers.

5. Device according to any claim 1, comprising a receive antenna, wherein said receive antenna comprises a receive beam aperture which is very narrow in elevation in comparison with the transmit beam aperture, by a ratio greater than or equal to about five, and means of dynamic orientation of said receive beam aperture towards the direction of arrival of the echo, in such a way as to increase the reception gain of said synthetic aperture radar device according to the invention.

6. Device according to claim 5, wherein said means of dynamic orientation of the receive beam aperture comprise electronic scanning means on reception, making it possible to follow the direction of arrival of the echo.

7. Satellite, comprising a device according to claim 1.

8. Satellite, comprising a device according to claim 5.

* * * * *